(12) United States Patent
Shoff et al.

(10) Patent No.: US 6,651,251 B1
(45) Date of Patent: Nov. 18, 2003

(54) SYSTEM AND METHOD FOR LINKING VIDEO, SERVICES AND APPLICATIONS IN AN INTERACTIVE TELEVISION SYSTEM

(75) Inventors: Daniel J. Shoff, Issaquah, WA (US); Joseph H. Matthews, III, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/270,633

(22) Filed: Mar. 17, 1999

Related U.S. Application Data

(63) Continuation of application No. 08/657,566, filed on Jun. 5, 1996, now Pat. No. 5,900,905.

(51) Int. Cl.[7] .................. G06F 3/00; H04N 7/173
(52) U.S. Cl. .................................. 725/37; 725/86
(58) Field of Search ...................... 725/56, 86–88, 725/8, 37, 38; 386/68, 83

(56) References Cited

U.S. PATENT DOCUMENTS

| | | | |
|---|---|---|---|
| 5,583,563 A | | 12/1996 | Wanderscheid et al. |
| 5,585,838 A | * | 12/1996 | Lawler et al. ............ 725/54 |
| 5,602,597 A | * | 2/1997 | Bertram .................. 725/56 |
| 5,621,456 A | * | 4/1997 | Florin et al. ............. 725/43 |
| 5,635,989 A | | 6/1997 | Rothermuller |
| 5,671,225 A | | 9/1997 | Hooper et al. |
| 5,699,107 A | | 12/1997 | Lawler et al. |
| 6,065,042 A | * | 5/2000 | Reimer et al. ........... 709/203 |

\* cited by examiner

Primary Examiner—Vivek Srivastava
Assistant Examiner—Hunter Lonsberry
(74) Attorney, Agent, or Firm—Klarquist Sparkman, LLP

(57) ABSTRACT

An interactive television system is provided with an interactive information system by which channels or services interact together. The information system provides informational messages that prompt a user to select an associated channel or service. If selected, the system transfers control to the selected channels or services. If necessary, information associated with the informational messages is provided to the selected channel or service. In a preferred embodiment the informational messages are sequentially displayed video segments. The video segments may be associated with other channels or services in the interactive viewing system. The user may use an input device, by depressing a single button, and launch another channel or service that is associated with the currently displayed video segment.

9 Claims, 10 Drawing Sheets

FIG. 7A

122 — Schedule 142

| Starttime | Endtime 144 | Scriptname 140 |
|---|---|---|
| Apr 15 1995 9:00AM | Dec 31 1999 11:59PM | MorningBarkerLoop |

124 — Script

| Name 146 | Startat 148 | Repeat until 150 | Repeatfor 152 | Reseton |
|---|---|---|---|---|
| 125a — MorningBarkerLoop | 00:00:00:04:00:00:00 | (null) | 365 Day | (null) |
| 125b — NineAMLoop | 00:00:00:09:00:00:00 | (null) | 01:00:00:00 | (null) |
| 125c — TenAMLoop | 00:00:00:10:00:00:00 | (null) | 2 HRS | (null) |

126 — Page 154

| Name | Startat 156 | Endat 158 | Duration | Onentry |
|---|---|---|---|---|
| MODAdScreen | +0:00:00:00 | (null) | (null) | (null) |
| PPVAdScreen | +0:00:23:00 | (null) | (null) | (null) |
| NewAdScreen | +0:00:00:00 | (null) | (null) | (null) |

FIG. 7B

Control Frame — 128

| Name — 160 | Control — 162 | Position — 164 | Startat — 166 | Endat — 168 | Duration — 170 | Onaction — 172 |
|---|---|---|---|---|---|---|
| MODAd | MODAdVideo | (50, 25) | +0:00:00:00 | (null) | 22 SEC | (null) |
| PPVAd | PPVAdVideo | (50, 25) | +0:00:00:00 | (null) | 28 SEC | (null) |
| NewAd | NewAdVideo | (50, 25) | +0:00:00:00 | (null) | 21 SEC | MSMOD |
| JumpButtonMOD | InvisibleJumpButton | (10, 150) | +0:00:04:00 | -0:00:04:00 | (null) | MSPPV |
| JumpButtonPPV | InvisibleJumpButton | (100, 50) | +0:00:05:00 | -0:00:03:00 | (null) | NEW |
| JumpButtonNew | JumpButton | (50, 50) | +0:00:04:00 | -0:00:03:00 | (null) | (null) |
| NetOpLogoPlay | NetOpLogo | (507, 345) | +0:00:03:00 | -0:00:03:00 | (null) | (null) |
| MODLine1Play | MODLine1 | (52, 355) | +0:00:05:00 | -0:00:03:00 | (null) | (null) |
| MODLine2Play | MODLine2 | (52, 377) | +0:00:05:00 | -0:00:03:00 | (null) | (null) |
| MODLine3Play | MODLine3 | (52, 399) | +0:00:05:00 | -0:00:03:00 | (null) | (null) |
| PPVLine1Play | PPVLine1 | (52, 355) | +0:00:05:00 | -0:00:03:00 | (null) | (null) |
| PPVLine2Play | PPVLine2 | (52, 380) | +0:00:05:00 | -0:00:03:00 | (null) | (null) |
| PPVLine3Play | PPVOLine3 | (52, 405) | +0:00:05:00 | -0:00:03:00 | (null) | (null) |
| MODPaperStripPlay | PaperStrip | (52, 345) | +0:00:03:00 | -0:00:03:00 | (null) | (null) |
| PPVPaperStripPlay | PaperStrip | (0, 345) | +0:00:03:00 | -0:00:03:00 | (null) | (null) |

244 — Name
248 — NewAd row
250 — JumpButtonNew row
252 — MODLine1Play row
254 — MODLine3Play row

FIG. 7C

Video Control — 176

| Name — 184 | Extent — 192 | Content — 188 | Offsetindex |
|---|---|---|---|
| MODAdVideo | (null) | ch_mod.m2 | (null) |
| PPVAdVideo | (null) | ch_ppv.m2 | (null) |
| NewAdVideo | (null) | ch_new.m2 | (null) |

Bitmap Control — 178

| Name — 186 | Extent — 194 | Content — 190 |
|---|---|---|
| NetOpLogo | (79, 94) | LOGO.bmp |
| PaperStrip | (418, 94) | STRIP.bmp |

Text Control — 180

| Name — 200 | Textvalue — 202 | Font — 204 | Size — 206 |
|---|---|---|---|
| MODLine1 | Now Playing on MOD ch. 26 | Gothic | 18 PTS |
| MODLine2 | Andy in the Barber's Chair. | Gothic | 18 PTS |
| MODLine3 | Press Action to see this now. | Gothic | 18 PTS |
| PPVLine1 | Now Playing on PPV ch. 4 | Gothic | 20 PTS |
| PPVLine2 | Elvis on the Beach. | Gothic | 20 PTS |
| PPVLine3 | Press Action to see this now. | Gothic | 20 PTS |

Push Button Control — 182

| Name — 208 | Extent — 210 | Resourceid — 212 |
|---|---|---|
| JumpButton | (64, 34) | 101 |
| InvisibleJumpButton | (0, 0) | 101 |

Include — 216

| Parenttype — 218 | Parentname — 220 | Childtype — 222 | Childname — 224 |
|---|---|---|---|
| SCRIPT | MorningBarkerLoop | SCRIPT | NineAMLoop |
| SCRIPT | MorningBarkerLoop | SCRIPT | TenAMLoop |
| SCRIPT | NineAMLoop | PAGE | MODAdScreen |
| SCRIPT | NineAMLoop | PAGE | PPVAdScreen |
| SCRIPT | TenAMLoop | PAGE | NewAdScreen |
| PAGE | MODAdScreen | FRAME | MODAd |
| PAGE | MODAdScreen | FRAME | JumpButtonMOD |
| PAGE | MODAdScreen | FRAME | NetOpLogoPlay |
| PAGE | MODAdScreen | FRAME | MODLine1Play |

FIG. 7D

| Include 216 242 | 218 | 220 | 222 | 224 |
|---|---|---|---|---|
| | Parenttype | Parentname | Childtype | Childname |
| | PAGE | MODAdScreen | FRAME | MODLine2Play |
| | PAGE | PPVAdScreen | FRAME | PPVAd |
| | PAGE | PPVAdScreen | FRAME | JumpButtonPPV |
| | PAGE | NewAdScreen | FRAME | NewAd |
| 246 | PAGE | NewAdScreen | FRAME | JumpButtonNew |
| | FRAME | MODAd | CONTROL | MODAdVideo |
| | FRAME | PPVAd | CONTROL | PPVAdVideo |
| | FRAME | NewAd | CONTROL | NewAdVideo |
| | FRAME | JumpButtonNew | CONTROL | JumpButton |
| | FRAME | NetOpLogoPlay | CONTROL | NetOpLogo |
| | FRAME | PPVSpecialPlay | CONTROL | Special |
| | FRAME | MODLine1Play | CONTROL | MODLine1 |
| | FRAME | MODLine2Play | CONTROL | MODLine2 |
| | FRAME | JumpButtonMOD | CONTROL | InvisibleJumpButton |
| | PAGE | PPVAdScreen | FRAME | NetOpLogoPlay |
| | FRAME | JumpButtonPPV | CONTROL | InvisibleJumpButton |
| | PAGE | MODAdScreen | FRAME | MODLine3Play |
| | FRAME | MODLine3Play | CONTROL | MODLine3 |
| | PAGE | PPVAdScreen | FRAME | PPVLine1Play |
| | PAGE | PPVAdScreen | FRAME | PPVLine2Play |
| | PAGE | PPVAdScreen | FRAME | PPVLine3Play |
| | FRAME | PPVLine1Play | CONTROL | PPVLine1 |
| | FRAME | PPVLine2Play | CONTROL | PPVLine2 |
| | FRAME | PPVLine3Play | CONTROL | PPVLine3 |
| | FRAME | MODPaperStripPlay | CONTROL | PaperStrip |
| | FRAME | PPVPaperStripPlay | CONTROL | PaperStrip |
| | PAGE | MODAdScreen | FRAME | MODPaperStripPlay |
| | PAGE | PPVAdScreen | FRAME | PPVPaperStripPlay |
| | FRAME | MODAd | CONTROL | MODAdVideo |
| | FRAME | PPVAd | CONTROL | PPVAdVideo |
| | FRAME | NewAd | CONTROL | NewAdVideo |
| | FRAME | JumpButtonMOD | CONTROL | InvisibleJumpButton |
| | FRAME | JumpButtonPPV | CONTROL | InvisibleJumpButton |
| | FRAME | JumpButtonNew | CONTROL | JumpButton |
| | FRAME | NetOpLogoPlay | CONTROL | NetOpLogo |
| | FRAME | MODLine1Play | CONTROL | MODLine1 |
| | FRAME | MODLine2Play | CONTROL | MODLine2 |
| | FRAME | MODLine3Play | CONTROL | MODLine3 |
| | FRAME | PPVLine1Play | CONTROL | PPVLine1 |
| | FRAME | PPVLine2Play | CONTROL | PPVLine2 |
| | FRAME | PPVLine3Play | CONTROL | PPVLine3 |
| | FRAME | MODPaperStripPlay | CONTROL | PaperStrip |
| | FRAME | PPVPaperStripPlay | CONTROL | PaperStrip |

SYSTEM AND METHOD FOR LINKING VIDEO, SERVICES AND APPLICATIONS IN AN INTERACTIVE TELEVISION SYSTEM

This application is a continuation of U.S. patent application Ser. No. 08/657,566, filed Jun. 5, 1996, now U.S. Patent No. 5,900,905, issued May 4, 1999.

FIELD OF THE INVENTION

The present invention relates to an interactive television information system and, more particularly, to an interactive information system that allows a user to view a sequential display of informational video segments and to actively respond to the informational segments by switching to related television services in a single step.

BACKGROUND OF THE INVENTION

As communication technology continues to expand, individuals are faced with an ever increasing number of information sources. For example, many cable television services offer dozens of different channels from which a user can choose. Some available satellite systems claim to offer hundreds of channels and it is widely expected that cable services will expand in an effort to match or exceed this capability. Similar gains in the quantity of available programs and services are anticipated in areas of communication other than television.

This dramatic increase in the amount of available programs and services greatly increases the amount and type of information accessible to a user. One common form of information accessible to users is advertising or product promotion. For example, home shopping networks are television channels dedicated to displaying and advertising various products. Consumers can typically purchase desired products by calling a telephone number displayed with the product.

Television users are also provided product information through "infomercials." A typical infomercial provides information and promotional material about a specific product or product line for an extended period of time, typically for thirty minutes to an hour. Infomercials generally include interviews with satisfied customers and detailed examples of how to use the product. Again, a user can generally purchase desired products by calling or writing to a source identified in the infomercial.

A problem with these services is that a user can only passively watch information and cannot interactively respond to the informational messages. For example, a customer who desires to purchase a product displayed cannot do so through the television, but has to use a different communication medium, such as a telephone or a mail service. This process is inconvenient and prone to error in that the user may incorrectly record or miss the opportunity to record the telephone number or address, resulting in a lost opportunity to purchase the product.

SUMMARY OF THE INVENTION

The present invention provides an interactive television information system in which a user can immediately respond to informational messages without the need for another communication medium, such as a telephone or a mail service. The interactive television system provides informational messages that may prompt a user to select an associated action. If the action is selected, the system transfers control to another channel or service related to the informational message.

In one embodiment, an interactive information system is incorporated into a viewing system which includes a head end in two-way communication with a plurality of viewer stations. The viewer stations are operatively coupled to a controller and an input device, such as a remote control, for providing user commands to the controller.

The head end provides to the viewer stations a plurality of video segments, such as informational clips, that are sequentially displayed. Some of the video segments may be associated with other channels or services in the interactive viewing system. The user may launch the channel or service associated with a particular video segment by depressing a single button on the input device while that segment is being displayed. Upon launching a new channel or service, the system may automatically provide information associated with the user or the users selection to that channel or service.

The interactive information system can be used in a variety of applications. For example, the video segments may be product advertisements. In response to a user's selection of an advertised product, the system may launch a service that allows the user to purchase the product. Additionally, the system may provide information (e.g., name of product, advertised price, user's identification or credit card number, etc.) to the launched service to facilitate and simplify the purchase of the product.

The interactive information system may also be used for a variety of other purposes, such as market research, polling, voting, promoting programs on other channels and the like.

These features and others of the present invention will be more readily apparent from the following detailed description of an exemplary preferred embodiment which proceeds with reference to the accompanying drawings.

BRIEF DESCRIPTION OF THE DRAWINGS

FIGS. 7A, B, C and D illustrate an exemplary data structure using the hierarchical structure of FIG. 6.

DETAILED DESCRIPTION OF THE ILLUSTRATED EMBODIMENT

Figure 1:
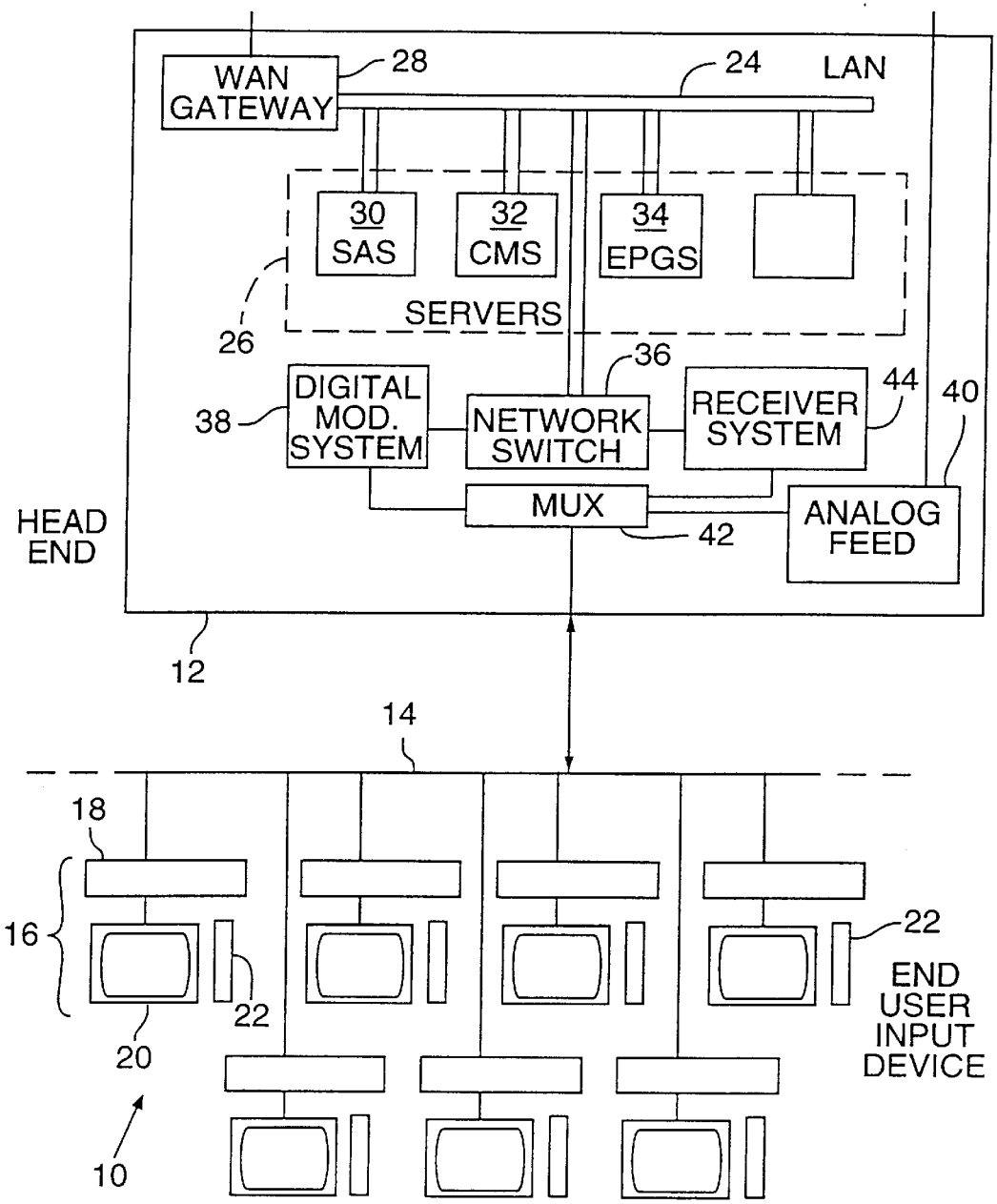
FIG. 1 is a block diagram of an interactive viewing system incorporating an interactive information system in accordance with a preferred embodiment of the present invention.

A simple block diagram of an exemplary interactive viewing system 10 into which the present interactive information system can be incorporated is illustrated in FIG. 1. The interactive viewing system 10 has a central head end 12 that supplies programming over a network 14 to multiple viewer stations 16 that are typically located in the homes of system users or subscribers. Each viewer station typically includes an interactive station controller 18, a video display 20, and a user input device 22. The viewer stations 16 accept user input and can, in addition to receiving programming from the head end 12, transmit information back to the head end. In this manner, the interactive viewing system 10, allows for independent two-way communication between the head end 12 and each of the viewer stations 16.

The interactive viewing system 10, which is an interactive television system in the illustrated example, serves as an operating environment for implementing the interactive information system in accordance with a preferred embodiment of the present invention. Of course, it should be appreciated that the interactive information system of the present invention can be implemented in a variety of other environments and may be adapted to a wide variety of systems. In particular, the programming provided by the head end 12 is not limited to traditional television programs. Rather, the programming may include standard analog video signals (e.g., NTSC, PAL or SECAM), digital video signals (e.g., MPEG1 or MPEG2), digital information related to computer-executed applications, or other types of programming. The present information system is suitable for use with systems offering a variety of program formats and types.

For purposes of simplicity, the interactive viewing system 10 is described with reference to widely available systems and standards, including conventional analog television receivers and cable-based video networks. It should also be appreciated, however, that the particular components of the interactive viewing system 10 may be implemented in accordance with a variety of conventions, standards, or technologies without departing from the underlying concepts of the present invention. For example, the conventional analog television receivers and cable-based video network illustrated in FIG. 1 could be implemented as digital video receivers and a satellite downlink transmission system, respectively. Likewise, the cable-based network could be an electrically conductive cable network, an optically conductive cable network, some other network technology, or a combination of these technologies.

As shown in FIG. 1, the head end 12 of the illustrated interactive viewing system includes a digital local area network (LAN) 24 that includes multiple computer servers 26 for performing various interactive system applications or functions and a digital communication gateway 28 to a wide area network (WAN) (not shown). The servers 26, which store and process information at the head end, may include, for example, service and application servers 30, continuous media servers 32, and electronic program guide data servers 34.

The service and application servers 30 process interactive service requests from subscribers and provide services and applications associated with network security, monitoring, object storage, financial transactions, data access, and other administrative functions. The continuous media servers 32 provide storage and on-demand or near on-demand delivery of digitized video information. The digitized video information can include video programming of substantially any duration ranging from individual image frames and brief video clips to full-length motion pictures. The digitized video information may be used in conjunction with a variety of applications, such as the present information system. A viewer can access such applications by tuning to a designated channel on their interactive viewing system 10 as will be further described.

The electronic program guide data server 34 stores program schedule information. For example, the program schedule information may include a program schedule database that identifies what program is available on a given channel at a given time. The program schedule information may also contain additional information about any particular program, such as, a brief description of the program, the stars of the program, a link to a video preview (stored on the continuous media server 32) for the program, whether the program is closed captioned, whether the program is stereo or a variety of other information. Such information is commercially available, for example, from Tribune Media Services or TV Data, both of Glens Falls, New York. Preferably, such information is delivered to the head end 12 via the digital communication gateway 28 and an associated wide area network.

As used here, the servers 26 may include various types of memories for storing information and various types of processors for processing information. Various functions of the servers described here may be combined so as to be carried out by a single server or may be divided and allocated among more than one server. Moreover, there may likely be a variety of functions and services carried out by the servers 26 which are not described here. The servers 26 communicate with the viewer stations 16 via a network communication switch 36, such as an asynchronous transfer mode (ATM) switch. For communication from the servers 26 to the viewer stations 16, the network communication switch 36 arranges digital information from the servers 26 in a standard bidirectional digital communication format for transmission over the network 14. For communication from the viewer stations 16 to the servers 26, the network communication switch 36 converts digital information from a standard bidirectional digital communication format for delivery to the servers 26.

In the exemplary system illustrated in FIG. 1, digital information from the servers 26 is frequency modulated by a digital modulator system 38 for transmission over the network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequencies, modulated at frequencies between the standard analog television frequencies, or modulated at frequencies above the standard analog television frequencies.

The head end 12 may be provided with analog signals through an analog feed 40. The analog signals provided to the head end may be standard analog video signals for conventional cablecast of television programs or other analog information. A multiplexing system 42 receives and mixes the frequency modulated digital information from the digital modulator system 38 and analog signals obtained from the analog feed 40 and delivers a composite signal to the interactive network 14 where it is made available to viewer stations 16. A reverse channel receiver system 44 receives and demodulates communications from the viewer stations 16 for processing by the servers 26.

Preferably, the network 14 carries such bidirectional communication between the viewer stations 16 and the head end 12. Alternatively, communication between the viewer stations 16 and the head end 12 can be carried by different communication systems. For example, communication from the head end 12 to the viewer stations 16 could be carried on a satellite downlink while communication in the other direction is carried on a terrestrial modem link.

Figure 2:
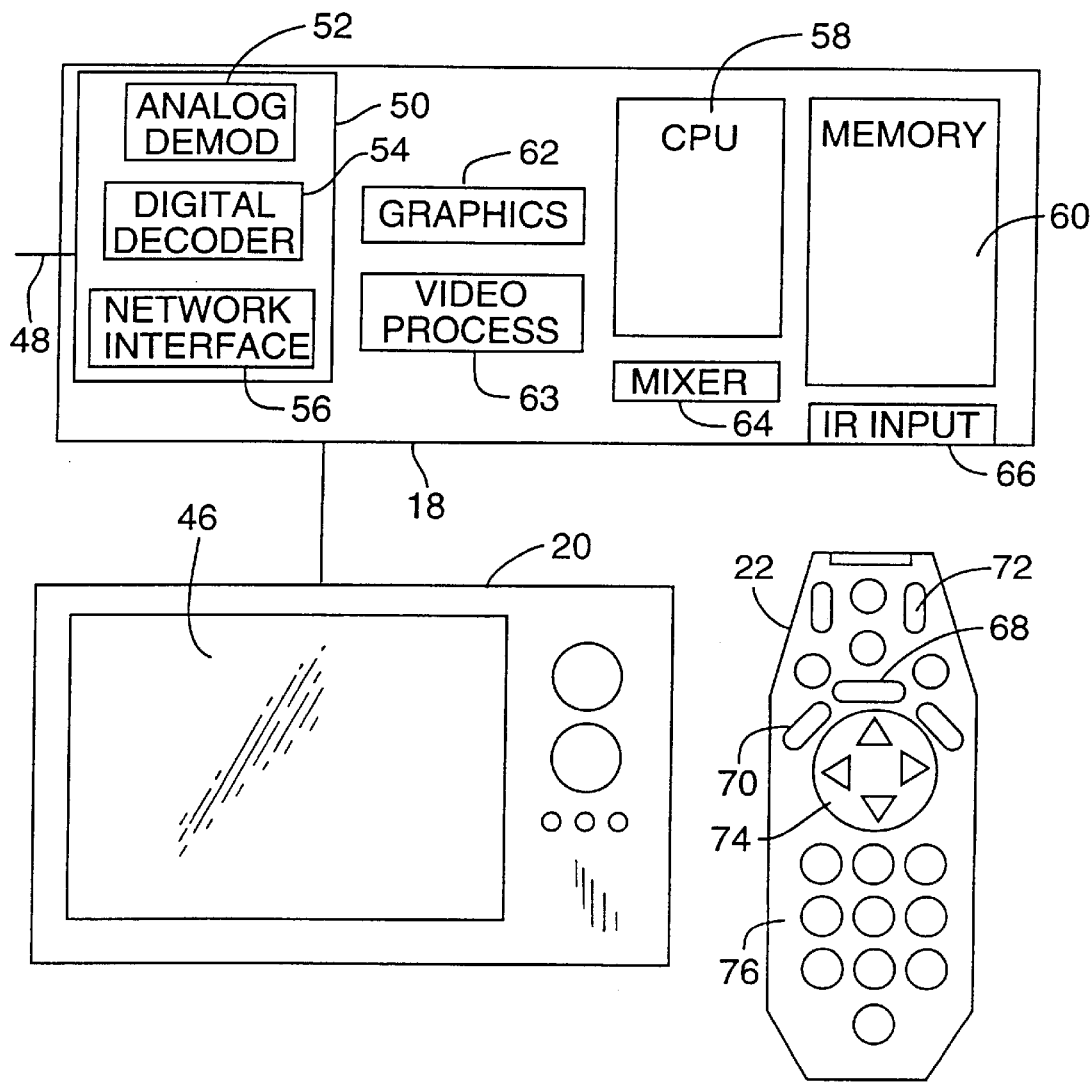
FIG. 2 is an enlarged diagram of a viewer station illustrated in FIG. 1.

A simplified block diagram of an exemplary viewer station 16 is illustrated in FIG. 2. The illustrated viewer station includes an interactive station controller 18 which is sometimes referred to as a set top box, at least one video display 20 such as a television, and an input device 22 such as an infrared remote control. Although it is shown distinct from the video display 20, the interactive station controller 18 could alternatively be integral with the video display 20.

The interactive station controllers 18 transmit information to and receive information from the head end 12. The information typically relates to applications executed by processors residing at the head end 12 and the interactive station controller 18, as described below in greater detail.

The interactive station controller 18 controls the video display 20 and communicates with the head end 12. Controlling the video display 20 of a conventional analog type may include, for example, delivering an analog video signal directly to the video display 20 for display on a screen 46, converting a digital video signal to a suitable analog form for display, generating a video signal for display, or executing an application that includes displays on video display 20.

The interactive station controller 18 includes an input 48 from the network 14 that delivers communications or information from the central head end 12 to a communication interpretation system 50 having, for example, an analog television demodulator 52, a digital video decoder 54, and a digital network communication interface 56. The demodulator 52 functions as a conventional television tuner for selecting one or more of multiple conventional analog video signals present at the input 48. The video decoder 54 functions as a digital equivalent of demodulator 50 for selecting one or more of multiple digital video signals present at input 48. The network communication interface 56 communicates with digital information which may be carried over baseband frequencies below the conventional analog video signal frequencies, over frequencies between conventional analog video signal frequencies, and over frequencies above conventional analog video signal frequencies.

A central processing unit (CPU) 58 in conjunction with a memory system 60 controls operation of the interactive station controller 18. For example, the CPU 58 controls selection of analog-based programming, digital-based programming or applications delivered from the head end 12, accesses or activates selected applications, or delivers information to or requests information from the head end 12.

The interactive station controller 18 also may include a graphics subsystem 62 that is controlled by the CPU 58 to form graphics images, including user interface displays, on the video display 20. A video processor subsystem 63, also controlled by the CPU 58, provides control in generating and displaying video images. A mixer 64 receives the programming or applications signals received from the central head end 12 or CPU 58, graphics image signals from the graphics subsystem 62, and video image signals from the video processor subsystem 63 and delivers a mixed image signal to the video display set 20. As used here, mixing may include compositing, blending, and masking of image sources such as digital video, analog video, locally generated graphics and various overlays and bitmap images.

The interactive station controller 18 also includes an infrared receiver and decoder system 66 that receives user input from the user input device 22 and delivers the input to the CPU 58. The input device 22 can be used by a user of the interactive viewer system 10 to input commands. The input device 22 is provided with a number of keys which may be pressed by a user to input commands. Based upon the keys pressed by a user, the input device 22 generates and emits infrared signals. These signals are detected by the infrared receiver and decoder system 66 of the interactive station controller 18, decoded, and provided to the CPU 58. The commands may be processed by the interactive station controller 18, may be communicated to the head end 12 for processing, or a combination of both. In the example system illustrated in FIG. 2, the input device 22 is a hand-held infrared remote control.

The illustrated input device includes at least a menu key 68, an action key 70, a channel up/down key 72, a navigation key 74, and a numeric keypad 76. Using the channel up/down key, the navigation key or the numeric keypad, the user may launch the informational service application by turning to a designated channel. The use and function of the action key 70 on the input device 22 is described further below.

The illustrated interactive television information system sequentially displays a plurality of video segments on a user's video display. At least one of the video segments is associated with another product, program, or service available to the user on the interactive. viewing system 10. For example, a video segment may be a promotional clip of a full-length program available on a pay-per-view channel. If the user wants to purchase the full-length program, the user can select the video segment by, for example, pressing the action key 70 while the video segment is being shown. Upon selection of the video segment, the interactive information system transfers control to the pay-per-view channel for ordering or viewing of the selected program. Of course, a video segment could be associated with a variety of programs, services or applications other than a pay-per-view channel. Upon selection of such a video segment, the information service system would transfer control to the appropriate program, service or application. In some instances, the transfer may include the transfer of information for use by the associated program, service or application. For example, a parameter (e.g. title) such as state information associated with the currently displayed video segment may be transferred to the launched application.

Figure 3:
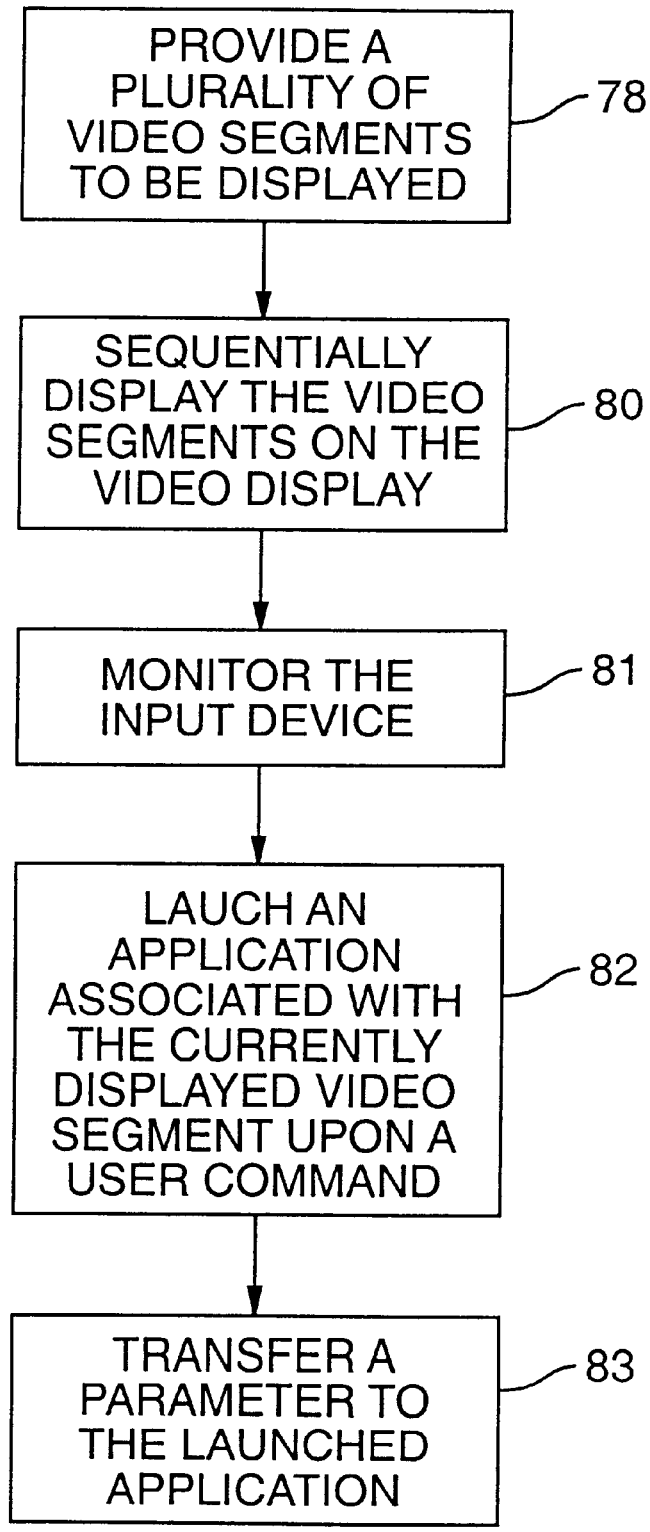
FIG. 3 is a top-level flowchart of an exemplary interactive information system illustrating one manner of sequencing through a plurality of video segments and launching another application based on a user command.

FIG. 3 is a top-level flowchart of an exemplary interactive information system adapted to provide informational messages and allow a user to immediately respond to the informational messages without the need for another communication medium, such as a telephone or a mail service. In steps 78 and 80, video segments are provided by the head end 12 and are sequentially displayed on the video display 20. The video segments may be any desired length, but typically range from a few seconds to a few minutes. At least some of the video segments are associated with one or more of many programs, services or applications available in the interactive viewing system. Although the video segments are sequentially displayed, they may be displayed in any desired order. In some embodiments, the content or sequence of the video sequence may be specially customized for a particular user or category of user.

As illustrated in step 81, the system monitors the input device 22 to detect whether a user has activated any commands. In the illustrated system, monitoring is accomplished by the CPU 58 (FIG. 2), which receives information from the infrared receiver and decoder system 66. Other systems may be used to monitor for user input. For example, the input device can be a computer keyboard, joystick, or the like which contain integrated circuits that monitor for user input. Voice recognition circuits may also be used, so that the interactive viewing system may monitor for user audible commands.

As represented at step 82, the interactive information system may launch an application or service associated with the currently displayed video segment in response to a user input command. By launching another application or service, the information system directly communicates with other applications and services in the interactive viewing system. If no user input commands are detected, then the information system continues to sequentially display video segments in step 80.

Step 83 illustrates that the interactive information system may also transfer a parameter such as state information to the launched application. The parameter may be associated with the video that was being displayed when the user activated the input device. Alternatively, the transferred information may be associated with the user of the system. Transferring a parameter may be a powerful tool allowing different applications and services in the interactive viewing system to communicate together. For example, a viewer may view a video segment related to a product that they wish to purchase. Upon activating a command on the input device, the interactive information system can launch a check out window application to allow the user to purchase that product. The information system may pass to the check out window information, such as an item number or name of the desired product, needed by the check out window application to complete the desired transaction.

Figure 4:
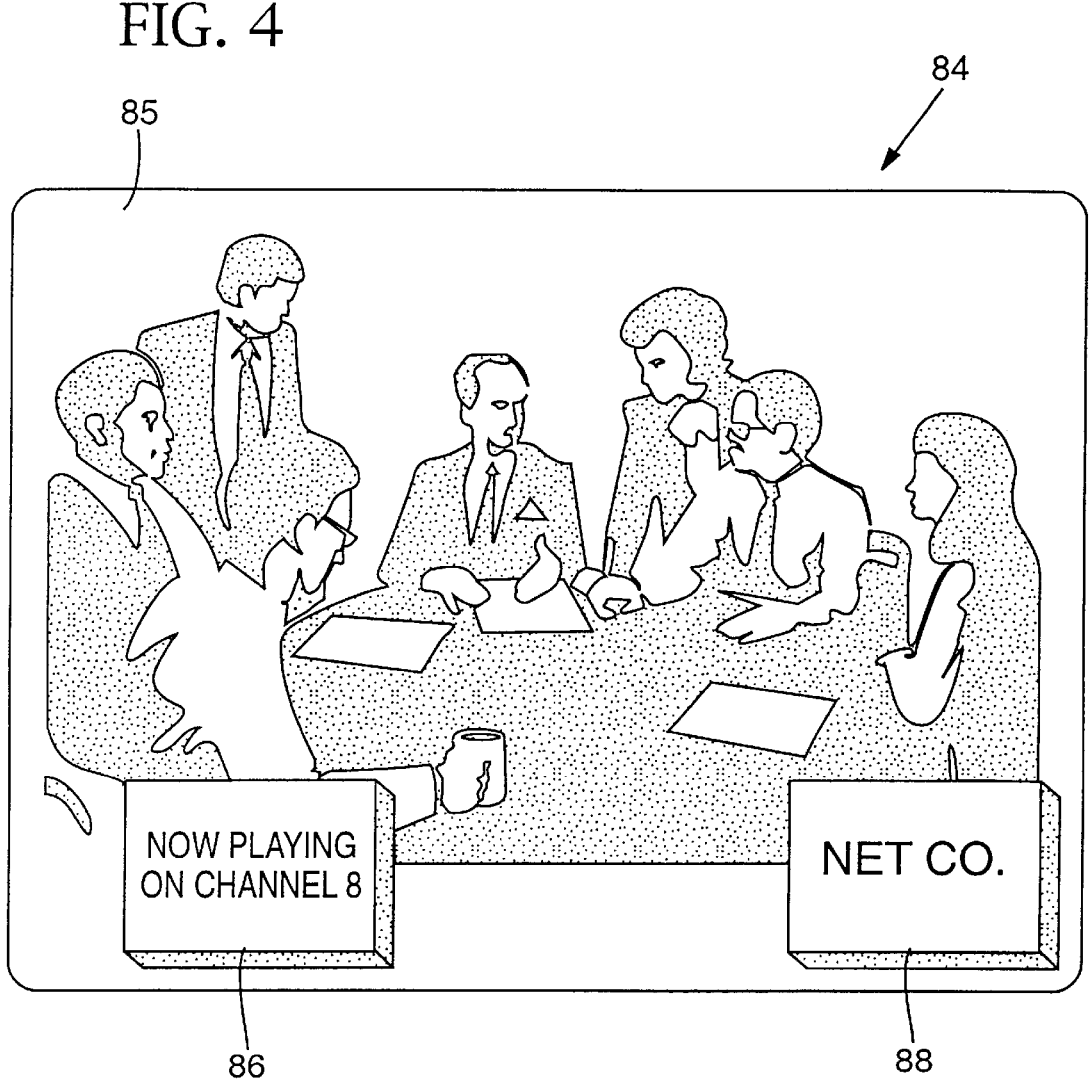
FIG. 4 is an illustrative display of a video segment displayed by the illustrated interactive information system.

FIG. 4 illustrates an exemplary display 84 on the video screen 46 used by the exemplary interactive information system. The illustrated display represents one of a plurality of video segments displayed as indicated in step 80 of FIG. 3. The display 84 is a composite video image having a number of visual elements, such as an information panel 85, a violator panel 86, and a channel logo 88. The information panel 85 appears as a bottom layer with the violator panel and channel logo overlapping a lower portion of the information panel. The information panel 85 covers a majority of the screen and is the region where video segments are displayed. The illustrated information panel shows, for example, a short video promotion of a program or service that is available on another channel in the interactive television system, as will be further described.

The violator panel 86 is a bitmap graphic informational display layered on top of the information panel and can be used for displaying text. The text provides additional information or highlights concepts related to a currently displayed informational message on the information panel. For example, the illustrated violator panel 86 indicates that the informational message relates to a program playing on channel 8. In this manner, the violator panel can be used to inform or prompt a user of various options associated with the displayed informational message. For example, activating the action key 70 during the display illustrated in FIG. 4 will automatically change the interactive television channel to channel 8, where the current movie, service or show is being displayed. Thus, depression of a single key will act to launch another application available through the interactive television information service system.

The channel logo 88 is also a bitmap graphic layered on top of the information panel and is used in the illustrated embodiment to identify the currently viewed channel, such as a network company or a third-party marketing company. The bitmaps may be created using a 24-bit palette and then converted to a single 8-bit palette using a dithering algorithm. The described layout of the video display may of course be altered based on the application. For example, the information panel and channel logo may be excluded altogether from the display if desired.

Figure 5:
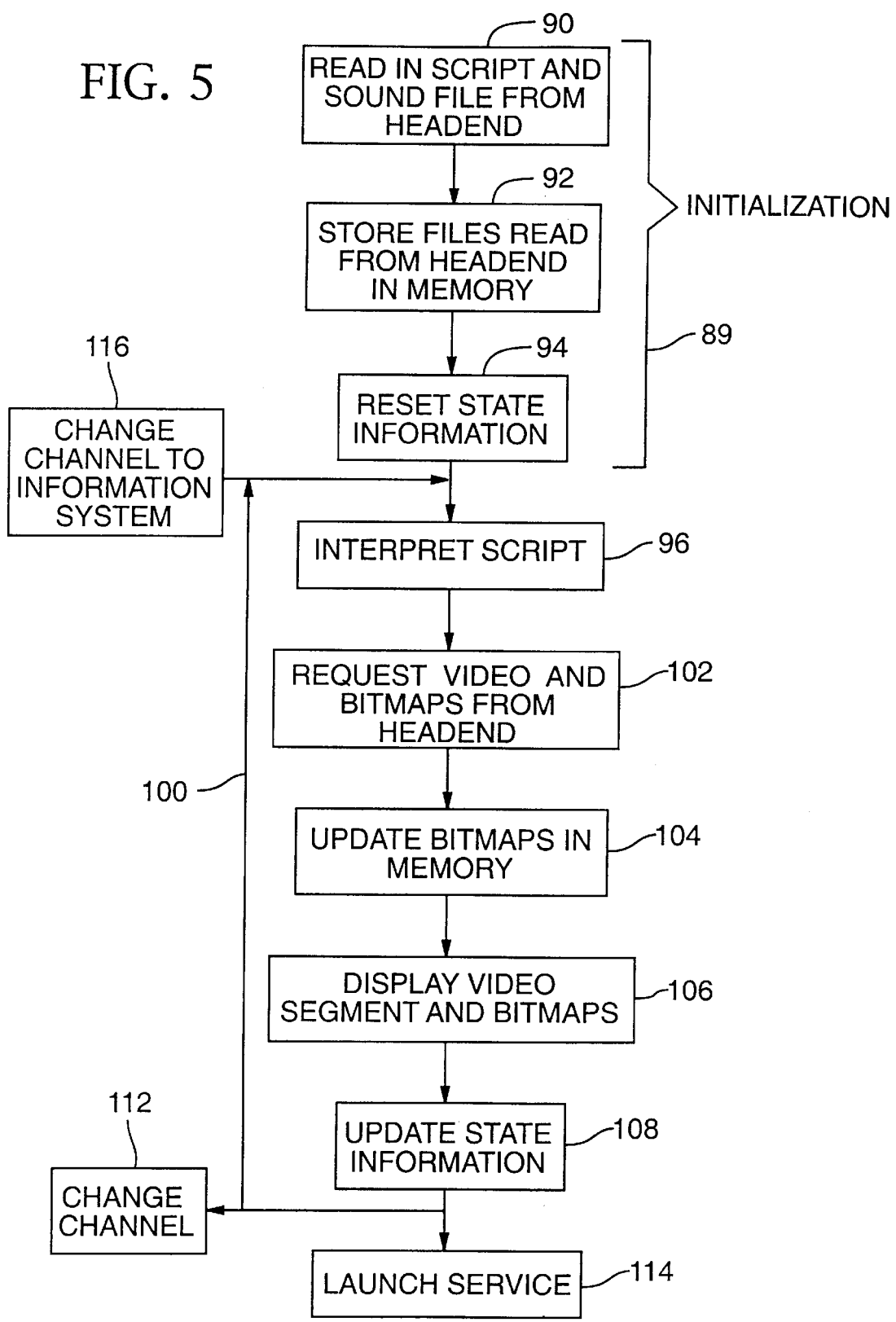
FIG. 5 is a flowchart of the illustrated interactive information system showing one manner of sequencing through a plurality of video segments including an initialization routine.

FIG. 5 is a flow chart of an example software routine for the illustrated interactive information system. At the time of system initialization 89, as a first step 90, the information service system reads a script database and a sound file from the head end continuous media servers 32. The script database and sound file provide data such as timing, sizing, bitmap overlays, and the order that video segments are to be displayed so that the information system can sequence through a series of video segments.

In the illustrated embodiment, the script database and sound file are stored in memory 60 (FIG. 2) in the interactive station controller 18 as shown by step 92. A user can launch the information system by using the input device to change to a channel associated with the system. When the information service system is launched, all state information is reset at step 94. Thus, after initialization, the first video segment in the sequence will be displayed.

Step 96 is an entry point for a main loop shown by arrow 100. Step 96 indicates that the script is interpreted. Interpretation of the script is a process (described more fully below) by which the information system determines which video segments and bitmap overlays are to be displayed.

After the script is interpreted, step 102 indicates that the video segments and bitmaps to be displayed are requested from the head end. During this step, the information system requests the head end continuous media servers 32 to provide a desired video segment and any necessary bitmaps based on the information system's interpretation of the script. The bitmaps may contain graphics information necessary for the display of the violator panel 86 and channel logo 88 (FIG. 4).

Bitmaps read from the head end are stored in the memory 60 as is indicated by step 104. Preferably the bitmaps will be stored in a cache memory (not shown) located in the memory 60. Alternatively a dedicated cache may also be used. The stored bitmaps may be used later by the information service system to avoid unnecessary repetition of reading bitmaps from the head end.

The video segments and bitmaps are then displayed on the video display 84 as is represented by box 106. The display may be similar in appearance to that shown in FIG. 4. Of course, those in the art will recognize that a wide variety of displays and display elements could also be used in implementing the interactive information system.

State information is updated and stored in memory 60 during this process, as shown by step 108, to indicate the current status of the script, such as which video segment is currently being displayed. As indicated by arrow 100, after updating the status, the information system will loop back to the interpretation step 96 so that it will repetitively interpret the script and request video segments and bitmaps to be displayed. Thus, the information system will sequentially play video clips as called out by the script database until the user takes action.

As illustrated at step 112 of FIG. 5, a user may exit the information system by changing the channel using input device 22. The system may be configured so that the step 112 can occur anywhere between steps 96 and 108. Alternatively, the time during which a user may change the channel, can be restricted. For example, the system may be configured to accept user commands only when the violator panel 86 (FIG. 4) is displayed. This configuration may help to avoid the misinterpretation of a command given near a transition from one video segment to another. The user may also press the action key, illustrated at step 114. Pressing the action key causes the interactive information system to perform a predetermined action, such as launching another application or service, associated with the displayed video segment. By launching another application or service, the information system directly communicates with other applications and services as will be further described. The applications or services can be located on other channels or they can be associated with the information system itself.

The user may reenter 116 the information system after exiting or launching another application by returning to the designated channel assigned to the information system. Upon reentry, the state information will be reset so that the information system will start the script at the beginning. However, any cached bitmaps that remain intact from earlier use and may be re-utilized by the information system.

Figure 6:
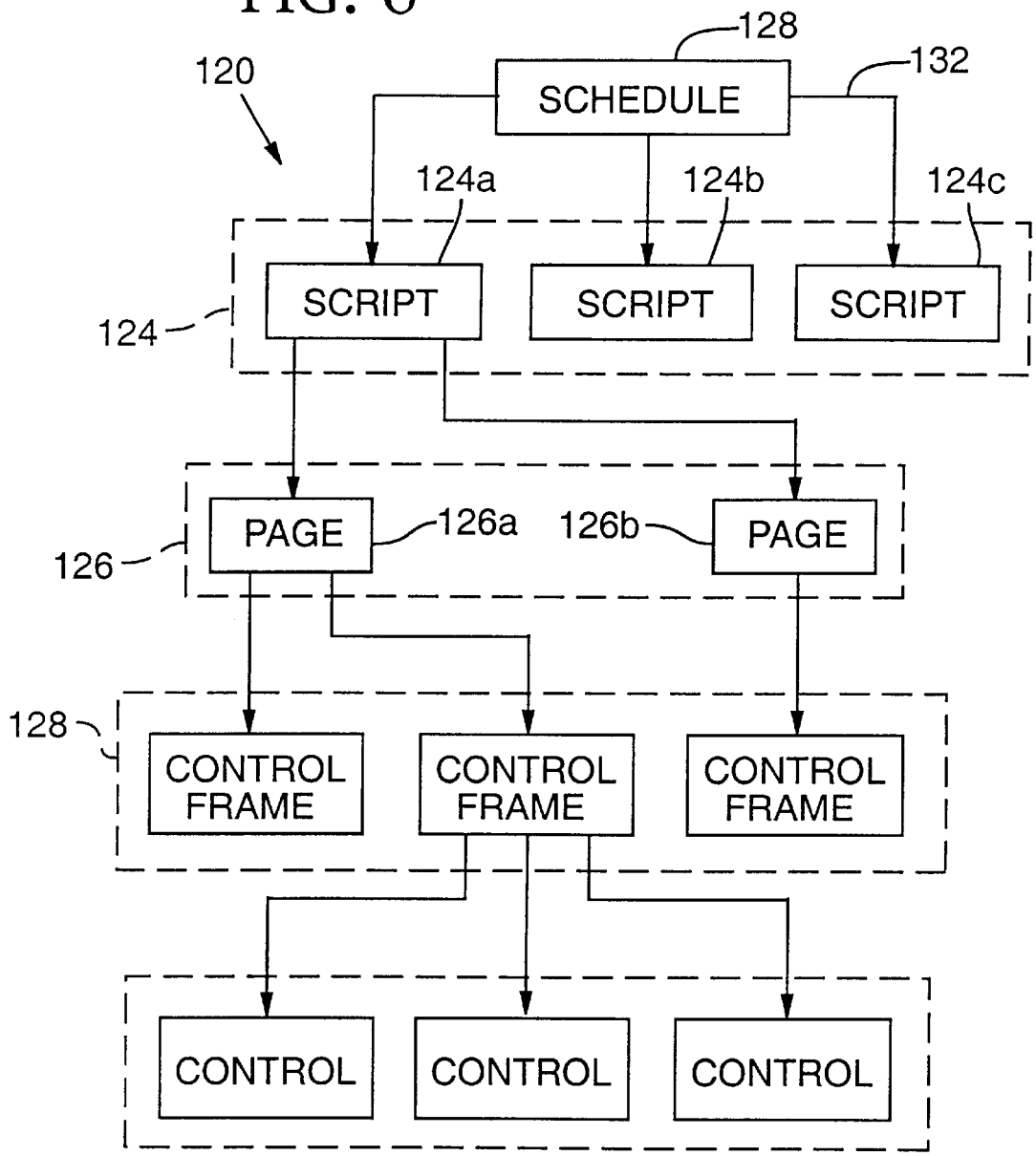
FIG. 6 is a block diagram showing one example of a hierarchical structure of objects used to implement the plurality of video segments of FIG. 5.

FIGS. 6 and 7A–7D show the hierarchical data structure 120 of objects used by the illustrated embodiment of the information system to implement the sequential display of a plurality of video segments and to identify parameters that should be passed if the action key 70 is depressed. The structure also provides additional information such as the location of bitmap displays (text, channel logos, etc.) overlapping the video segments. FIG. 6 is a generic schematic diagram showing the interrelationship between different objects in the information system while FIG. 7 is a specific example of the hierarchical data structure 120. This data structure defines the script of video segments to be displayed and is interpreted in step 96 of FIG. 5.

Illustrated from top to bottom in FIG. 6, the hierarchical structure includes at the top-most level a schedule object 122 (also called the schedule) followed by script objects 124 (also called scripts), page objects 126 (also called pages), control frame objects 128 (also called control frames), and control objects 130 (also called controls). The hierarchy is structured to have specific parent-child relationships between the objects as indicated by connecting arrows 132. For example, schedule object 122 is a parent to script objects 124a, 124b and 124c. Script object 124a is a parent to page objects 126a and 126b, while script objects 124b, 124c are parents to other pages (not shown) and so forth. The parent-child relationships are not limited to those shown in FIG. 6. For example, script objects may also have a parent relationship to other script objects and page objects can be parents to other page objects. Additionally, although the hierarchy is shown having control objects 130 (child) controlled by control frame objects 128 (parent), which are in turn controlled by page objects 126 (grandparents), which are controlled by script objects 124 (great grandparents) and so on, any generation in the hierarchy can be by-passed. For example, script objects may have a parent relationship to control frames. It will be recognized that only a portion of the tree structure is illustrated in FIG. 6.

The schedule object 122 is used by the interactive information system to determine which script object in the current database should be used for processing. The schedule object of the illustrated system contains a script name designating which script object should be executed and a start and end time. FIGS. 7A and 7B show a script 140 named "morningbarkerloop" and having a start time 142 of Apr. 15, 1995 at 9:00 AM and an ending time 144 of Dec. 31, 1999 at 11:59 PM. The start and end time will allow the information system to compare these times to the system clock and correspondingly execute the designated script object within these intervals. Although only one schedule object is shown, any number of schedule objects can be used with varying start and end times. Conversely, if only one script object is to be run at all times, then the scheduler need not be implemented.

At a level below the schedule object 122 are the script objects 124. Script objects can control any desired number of page objects 126 allowing the pages to be sequenced and scheduled in relative time. The script objects contain a name field 146 so that the schedule object can identify a designated script object. FIG. 7A shows three names 125a, 125b, and 125c in name field 146. The script objects also have a start time field 148 labeled as "start at" and an end time field 150 labeled as "repeat until" which allows the script objects to be repeated until an absolute designated time (based on the system clock). The start time field may be set to zero, in which case the actual start time will be controlled by either the schedule object 122 having a parent relationship to the script objects 124 or by other script objects which are parents to the script. In this way, the script objects can have either absolute or relative start times. In the case of FIG. 7A, a "null" character in the end time field 150 indicates that timing information is controlled by other fields or other objects. In this example, a "repeat for" field 152 allows the script to be repeated from the time duration specified. The start and end time fields have the following format: yy:mo:dd:hh:mi:ss:ff where yy is the last two digits of the year, mo is the number of the month, dd is the date of the month, hh is the hours on a 24-hour clock, mi is the minutes and ss is seconds and ff is a frame number being a number between 0 and 29 to represent the NTSC standard of 30 frames per second.

At a level below the script objects 124 are the pages 126. The pages implement single screens and provide the controls for the screen and the relative timing information that allows the controls to be appropriately placed. The pages include a name field 154, allowing them to be used by multiple scripts. The pages also have a start time field 156 which allows the page to begin execution relative to its parent script and an ending time 158. In the case of FIG. 7A, the ending time 158 is designated a "null" so that the control frames will dictate the duration as will be further described.

The next level in the hierarchy is made up of the control frames 128 (FIG. 7B). Control frame objects add position and scheduling information to the basic display controls. The control frames include a name field 160, so that they can be used by multiple pages, a control field 162 which identifies the child relationship of a control object, a position pair 164 which designates the coordinates at which to place the identified control objects, a start time field 166, which is a relative time to its parent page, an end time field 168, which is the time the control frame stops processing relative to its parent page (specified as a negative), a duration 170 indicating the length of the control frame, and an "on action" field 172 which indicates what action the information system will perform when an action key 70 is pressed.

Thus, using the "on action" field, the system can interact with other channels or services in the interactive viewing system 10. Additionally, parameters, such as state information, can be passed to the other channels or services. For example, as the script is being displayed, various video segments are being sequentially played, when the user depresses the action key 70, the information system will immediately transfer control to another application or service by launching the identified object in the "on action" field. The title of the video segment displayed at the time of depression of the action key can be passed as a parameter (e.g., global or an argument in a call routine). The name of the video segment to be passed can be found in the control field 162, for example. Other parameters and information may also be passed to the designated application or service. The information system can also enter the other channels or services at variable locations. For example, a movies-on-demand application may be available on another channel.

That application, when launched on its own, may include an introductory portion which displays information and allows a user to select a desired movie. Once a user selects a desired movie, the movies-on-demand application may switch to a check-out screen to allow purchase of the movie. The information system can interact with the movies-on-demand and, in the event that a user has already selected a movie, bypass the introductory portion and transfer directly to the check-out screen. In addition, the information system can pass the title of the movie as well as other necessary purchasing information to the movies- on-demand application to facilitate a user's purchase of the desired movie. After completing the appropriate check-out sequence a third application may be executed to display the movie.

The lowest level in the hierarchy is comprised of control objects 130. These objects are called out by control frames and specify the complete physical appearance of on-screen objects. The control objects, illustrated in FIG. 7C, may include video control 176, bitmap control 178, and text control 180.

Video and bitmap control objects 176, 178 both include name fields 184, 186 so that they can be called out by control frames, content fields 188,190 which is a name identifying the content of the video displayed, and an extent field 192, 194 specified as an (x,y) pair for sizing if necessary.

Text control objects include a name field 200 so that control frames can call out the text control objects, a text value field 202, which is the quoted string to be displayed, a font field 204, and a size field 206. Other fields may be added such as a color field.

Pushbutton objects 182 include a name field 208 so that they can be called out by control frames, an extent field 210 used for sizing of the pushbutton, and a resourceid field 212, used to identify the bitmap used in conjunction with the button face.

An include table 216 (FIGS. 7C and 7D) is used to indicate parent and child relationships between the object. For example, any scripts in the table will list pages that the script will display, and the pages will list control frames, which will in turn list controls. The include table 216 has a parent type field 218, parent name field 220, child type field 222, and child name field 224. The parent type and parent name fields identify the parent in the hierarchy that is identifying a child type and child name to be displayed.

In operation, and using the data structure shown in FIGS. 7A, 7B, 7C and 7D, the morning barker loop is called out in schedule object 122 to be displayed from Apr. 15, 1995 to Dec. 31, 1999. The include table 216 indicates at lines 226, 228 that the morning barker loop will display the "NineAM-Loop" and the "TenAMLoop". The script objects will execute the NineAMLoop at its designated start time (found in field 148 of script 124) of 9 AM for 1 hour as is called out in the Repeatfor field 152. After completion of the hour, the TenAMLoop will begin being displayed at 10 AM for 2 hours.

Lines 230 and 232 in the include table 216 indicate that the NineAMLoop will display a MODAdScreen and a PPVAdScreen. The "Startat" field 156 of Page 126 indicates a relative time of zero meaning that the MODAdScreen will be displayed at 9 AM (controlled by the parent NineAMLoop). The PPVAdScreen will be displayed starting 23 seconds after the start of the MODAdScreen as indicated in the "Startat" field.

Lines 234, 236, 238, 240 and 242 in the include table 216 indicate the bitmap overlays that will be displayed with the MODAdScreen. Specifically, the frames listed in the "child-name" column will be displayed, namely, MODAd, JumpButtonMOD, NetOpLogoPlay, MODLine1Play, and MODLine2Play. Line 244 of control frame 128 indicates the MODAd will start at the beginning of the 9 AM loop (start time defaults to parent) and run for a duration of 22 seconds. MODAd is a parent for the control MODAdVideo as indicated in the control frame table in the control field 162 or in the include table 216 at line 246.

JumpButtonMOD can also be found in control frame 128 at line 248. The start time field 166 indicates that the jump button will be displayed 4 seconds after the start of MODAd and end 4 seconds before the end of MODAD. The jump button may be, for example, the violator panel 86. If the action key 70 is pressed, then the MSMOD routine listed in the "on action" field 172 is executed to launch a new channel or service in the illustrated example, a Movies-on-Demand application associated with the interactive viewing system. State information or other information may be passed to MSMOD as well. Additionally, passing state information indicates to the new channel or service what promotional information was being displayed when the user pressed the action key. Thus, in a single step (depression of the action button) the user can transfer control and information related to which promotion being displayed to another channel or service. NetOpLogoPlay, MODLine1 Play, and MODLine2Play can also be found in the control frame table 128 at lines 250, 252 and 254, respectively, and function similar to MODAD and JumpButtonMOD described above.

It is best to preserve a 3 to 4 second buffer between the page's initiation and termination and all enclosed control frames. For example the jump button (violator panel 86) will be displayed 4 seconds after starting and disappear 4 seconds before ending of the video segment. During the time the jump button is visible, the action key can be selected. The jump button may also fade in after the promotion has started and fade out prior to the end of the promotion. The system may be configured to only allow the user to launch another application during the time the violator panel 86 is visible on the screen. This prevents the user from inadvertently selecting the wrong action during the transition between video segments.

At the control level, MODAd will control MODAd Video, which can be found in Video Control 176. Similarly, JumpButtonMOD will control InvisibleJumpButton found in PushButton Control 182.

Thus, the present invention provides an interactive television system with an information system in which a user can immediately respond to informational messages without the need for another communication medium, such as a telephone or a mail service. The interactive information system provides informational messages on a channel that may prompt a user to select an associated action. If an action is selected, the system transfers control to other channels or services related to the informational messages.

The interactive information system may be used in a variety of applications such as impulse shopping, where an interested shopper has an immediate opportunity to buy an advertised product or service; network operator's services, where viewers may order new channels or services and have them immediately available, without telephone calls or mail; selling advertising space, where network operators can sell advertising space to local or national advertisers; polling or voting, where viewers may express themselves via "straw polls" or comment on the quality of services available; and market research, where the interactive information system may capture information of products, programs or services that users purchase.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

We claim:

1. An interactive television system for displaying video segments on a television and for receiving user input related to the video segments, comprising:
    a script providing an order that a plurality of video segments are displayed and timing information related to an amount of time the video segments are displayed;
    the script including:
        a script object including a name field that identifies at least first and second different series of video segments that are displayed on the television, only one of which is displayed at a time in a continuous loop, and a timing field identifying a time the first series of video segments are displayed on the television in a continuous loop and a time that the second series of video segments are displayed on the television in a continuous loop; and
        a control frame that includes multiple controls related to bitmaps that are displayed overlaying the video segments;
    the control frame including a name field that identifies a particular control, a duration field that indicates the length of time the control is displayed overlaying the video segment, and an action field that indicates an action to take based on user input that occurs while the control is displayed on the television;
    the action field for identifying an application to launch that is associated with a currently displayed video segment in response to user input.

2. The interactive viewing system of claim 1 wherein the control frame further includes position information indicating a position that a bitmap is to be displayed on a video segment.

3. The interactive viewing system of claim 1 wherein the control is displayed on the video segment a predetermined period of time after the start of the video segment to prevent the user from inadvertently selecting the wrong action during a transition between video segments.

4. The interactive viewing system of claim 1 wherein the control is removed from the video segment a predetermined period of time before the end of the video segment to prevent the user from inadvertently selecting the wrong action during a transition between video segments.

5. The interactive viewing system of claim 1 further comprising a table having a parent field and a child field that establishes a parent child relationship between the script object and the control frame.

6. The interactive viewing system of claim 1 further including a page object that establishes the different screens that are displayed on the television during a video segment.

7. The interactive viewing system of claim 1 wherein each of the video segments has a title associated therewith and based on user input, the title of the current video segment is passed to the launched application identified in the action field.

8. The interactive viewing system of claim 1 wherein the timing information provided by the script is an actual time synchronized to the system clock.

9. The interactive viewing system of claim 1 wherein the timing information provided by the script is a relative time that is relative to a starting time of the script.

* * * * *

UNITED STATES PATENT AND TRADEMARK OFFICE
CERTIFICATE OF CORRECTION

PATENT NO. : 6,651,251 B1
DATED : November 18, 2003
INVENTOR(S) : Daniel J. Shoff et al.

It is certified that error appears in the above-identified patent and that said Letters Patent is hereby corrected as shown below:

Column 12,
Line 25, delete "MODLine1 Play," and insert -- MODLine1Play --.

Signed and Sealed this

Sixth Day of July, 2004

JON W. DUDAS
*Acting Director of the United States Patent and Trademark Office*